United States Patent [19]
Kerton

[11] 3,949,151
[45] Apr. 6, 1976

[54] ARC FURNACES
[75] Inventor: Charles Philip Kerton, Rotherham, England
[73] Assignee: British Steel Corporation, London, England
[22] Filed: Mar. 4, 1975
[21] Appl. No.: 555,240

[30] Foreign Application Priority Data
  Mar. 12, 1974 United Kingdom............... 11008/74

[52] U.S. Cl............................................. 13/12; 13/18
[51] Int. Cl.²............................................ H05B 7/144
[58] Field of Search............................... 13/12, 18

[56] References Cited
UNITED STATES PATENTS

| | | | |
|---|---|---|---|
| 881,518 | 3/1908 | Wilson | 13/18 X |
| 1,244,415 | 10/1917 | Booth | 13/18 X |
| 1,287,849 | 12/1918 | Booth | 13/18 X |
| 3,789,127 | 1/1974 | Bowman | 13/12 |

*Primary Examiner*—R. N. Envall, Jr.
*Attorney, Agent, or Firm*—Bacon & Thomas

[57] ABSTRACT

An electric arc furnace powered by direct current includes three electrodes of negative polarity depending into the vessel from above and a plurality, e.g. six, of electrodes of the opposite polarity mounted in the hearth of the vessel. Switching means are provided selectively to connect one or more of the vessel electrodes in circuit whereby to regulate the lobes of power dissipation from the dependent electrodes as required. The vessel electrode design is such as to enable the furnace to be tapped whilst maintaining a reservoir of metal for the succeeding charge.

10 Claims, 4 Drawing Figures

ARC FURNACES

This invention relates to d.c. arc furnaces, and more particularly is an improvement in or modification of the invention in our co-pending U.S. Pat. No. 3,789,127.

In that application there is claimed a direct arc furnace connected to a source of direct current and including at least one electrode of one polarity mounted in a vessel for contact with a metal charge therein and a plurality of electrodes of the opposite polarity dependent into the vessel above the charge, the or each vessel electrode being constituted by a local reservoir of the metal located in the hearth of the vessel with a refractory clad elongated conductive rod of the said metal extending from it, the disposition of the electrodes relative to one another being such that arcs struck between the dependent electrodes and the charge are drawn inwardly towards one another.

In accordance with the present invention there is provided a direct arc furnace connected to a source of direct current and including a plurality of first electrodes of one polarity dependent into a metal refining vessel above a charge in the hearth, a plurality of second electrodes of the opposite polarity each constituted by a local reservoir of the metal located in the hearth at a position displaced from the centre and having a refractory-housed conductive rod of the said metal extending from it, and means for selectively connecting any one or more of the second electrodes in the d.c. circuit.

Preferably the vessel and hearth are of generally circular section and the first electrodes are symmetrically disposed around a circular path concentric with the vessel walls and are all connected to the negative source of polarity, functioning as cathodes. The second electrodes are likewise preferably symmetrically disposed around the vessel hearth.

With selective connection of the second electrodes in the manner of this invention the directions of the 'lobes' of power dissipation within the furnace during arcing can be manipulated so as to control and improve melting within the furnace, e.g. to melt down banks of scrap, to obtain a more even temperature distribution or to promote stirring. Refractory wear may also be reduced by avoiding hot spot erosion and the invention is particularly useful when continuous charging facilities are provided, since the 'thermal centre' defined by the lobes of power dissipation can be appropriately sited over the charging area. These advantages are of course additional to those which accrue from the adoption of a d.c. power furnace in contrast to a.c., e.g. a more stable and uniform arc, less electrode consumption and quieter operation.

In order that the invention may be fully understood, one embodiment thereof will now be described, by way of example, with reference to the accompanying drawings in which.

Figure 1:
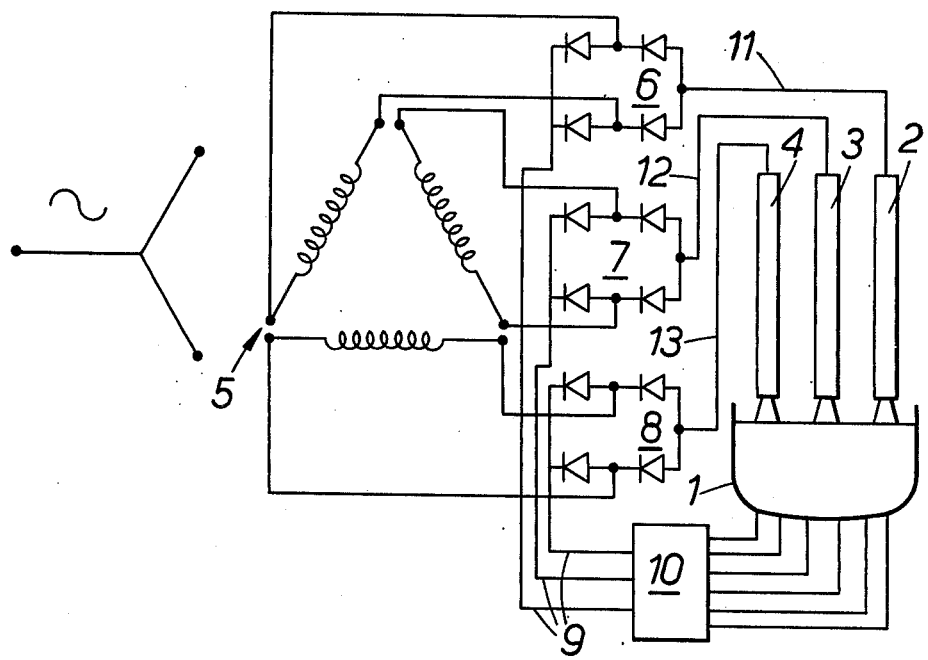
FIG. 1 illustrates a schematic circuit diagram of an arc furnace according to this invention together with the vessel and the electrodes.

Referring now to FIG. 1 the arc furnace comprises a vessel 1 and three dependent graphite electrodes 2, 3, 4 extending through a roof (not shown). The power supply for the furnace is derived from a star/delta-connected transformer 5, the secondary windings of which separately apply an appropriate phase to full-wave rectifier banks 6, 7, 8 comprising silicon rectifiers.

The positive outputs from these banks are individually coupled via leads or bus bars 9 through a switching mechanism 10 to one or more electrodes in the vessel which contact the melt, whilst the negative connections are separately coupled via leads or bus bars 11, 12, 13 to the electrodes 2, 3, 4 respectively.

With this form of coupling the arc voltage is increased by $\sqrt{3}$ over its a.c. value whilst the current is decreased by this amount — the same power and MVA obtains in each case.

Figure 2:
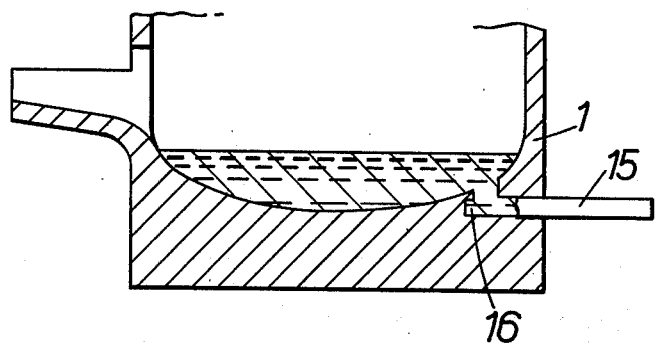
FIG. 2 illustrates a sectional side elevation of the vessel showing one of the vessel electrodes.

The configuration of the vessel electrodes is shown in FIG. 2 (one only for clarity) and this essentially comprises a solid steel elongated plug or rod 15 which opens into a terminal 'reservoir' 16 defined by a refractory-bound depression in the hearth of the vessel 1. The other extremity of the electrode is water-cooled.

With this arrangement then, when a hot metal and scrap charge is initially introduced into the vessel this makes contact with the solidified vessel electrode at 16 and the charge is melted in the normal way as with a.c. Any melting of the metal reservoir is of no consequence since contact is still maintained through the resulting solid/liquid interface. In practice, with the bath molten the temperature at the remote end of the electrodes 15 may be only of the order of 200°/300° so that the bus bar connections are unaffected by this contact and, by the same token, no impurities are fed back to contaminate the melt.

Figure 3:
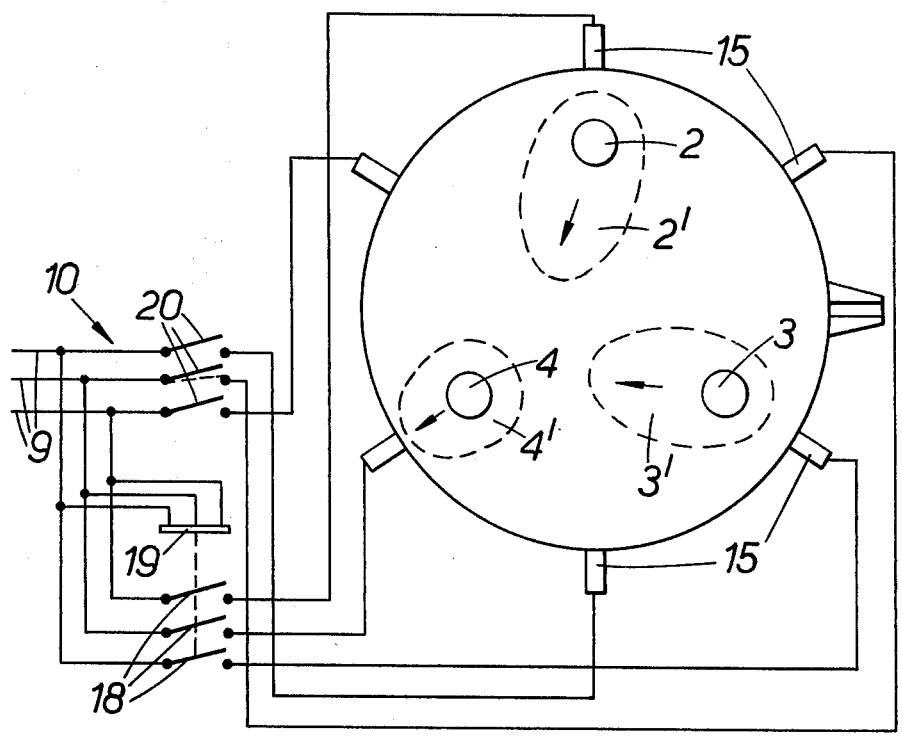
FIG. 3 illustrates the action of the d.c. arcs in plan view during one mode of operation involving selective switching.
Figure 4:
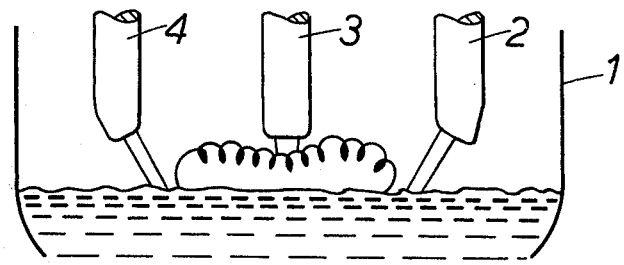
FIG. 4 illustrates the action of the d.c. arcs in elevation during another mode of operation.

More particularly, referring now to FIGS. 3 and 4, there are shown two different modes of operation under different switched conditions. In FIG. 3 and furnace 1 is shown in plan view with the six electrodes 15 extending radially towards the centre. The switching mechanism 10 comprises three switches 18 ganged together with a conductive link 19 and three individually operative switches 20.

In the positions shown the switches 10 are broken, and the link 19 couples together the cathodes of the three rectifier banks 6, 7 and 8. The individual switches 20 are also shown broken.

Consider now the situation where one of the switches 20 is closed, as shown by the dotted lines. Current now flows through only one of the vessel electrodes and then, via the melt and the arc, through each of the dependent electrodes 2, 3, 4 in turn. Under these conditions the lobes of power dissipation around the dependent electrodes are directed in the fashion shown by the dotted areas 2' 3' 4' in FIG. 3, the arcs being propelled in this direction, i.e. away from the operative vessel electrode, as a result of the interaction of magnetic fields associated with the arcs and this latter electrode. Clearly, this lobe configuration can be rotated by closing a different one of the switches 20 or by closing two of these switches together in which case the lobes will be oriented towards that wall of the furnace between two of the dependent electrodes. This directional characteristic displayed by the arcs is thus most useful for local high intensity melting in desired areas of the vessel.

Should the ganged switches 18 be closed instead of the individual switches 20, then the appropriate three symmetrically disposed vessel electrodes 15 will be operative. In this event the lobes of power dissipation will be of similar shape and inwardly directed together, all three arcs being 'blown-in' in the manner shown in FIG. 4, i.e. away from the refractory lining on the furnace walls, thus reducing 'hot spot' erosion arising from radiation/convection from the flames and/or slag attack.

The common 'blow-in' configuration is most useful for continuous charging techniques where particulate iron-bearing material may be charged into the vessel centrally of the three dependent electrodes, that is directly into the area where the flames are hottest.

Although this invention has been described with reference to the particular embodiments illustrated, it is to be understood that various modifications and alterations may readily be made without departing from the scope of this invention. For example, the vessel electrodes and the switching connections could be arranged so as to promote stirring of the melt and thus aid chemical reactions and attain a more even temperature distribution. With the preferentially directed high intensity arcs as shown in FIG. 3 for example, the arrangement lends itself readily to operation in a furnace having an elongated hearth rather than one of circular configuration.

Three vessel electrodes instead of the six shown could alternatively be provided, in this instance they may conveniently lie in alignment with the three dependent electrodes.

The electrical circuitry may also be revised. For example, the star/delta power input arrangement has merely been illustrated as an expedient since existing a.c. transformers for arc furnaces are conventionally of this type. A star connected secondary could equally well be used in which case the d.c. voltages and currents would be at the same level as for an a.c. furnace. Alternatively, a delta primary might be used since this ensures load balancing where only one or two dependent electrodes are taking current following arc blow-out or some other malfunction.

It is to be understood of course that the usual series inductors will be provided on the primary and/or secondary side of the transformer to limit the arc currents, and smoothing circuitry could be provided on the rectifier outputs.

We claim:

1. A direct arc furnace connected to a source of direct current and comprising
    a metal refining vessel having an insulating refractory hearth and side walls,
    a plurality of first electrodes of one polarity dependent into the vessel above a charge in the hearth,
    a plurality of second electrodes of the opposite polarity, each said second electrode comprising
    a local reservoir of the metal located in a well in the hearth and
    a refractory-housed conductive rod of said metal extending from said reservoir, and
    switching means for selectively connecting any one or more of the second electrodes in the d.c. circuit.

2. A furnace according to claim 1, wherein the first electrodes are connected as cathodes to a negative pole of the d.c. source and the second electrodes are connected to a positive pole of the source.

3. A furnace according to claim 2, wherein the first electrodes and the second electrodes are symmetrically arranged on separate circular paths concentric with the side walls of the vessel.

4. A furnace according to claim 3, wherein each local reservoir is constituted by
    a body of metal in the well and
    a fillet of said metal which is conjoined with the rod and which extends beyond the well in the hearth whereby, when the vessel is tilted for tipping, the reservoir is never completely evacuated.

5. A furnace according to claim 4, wherein the rods extend generally radially of, and lie in a plane perpendicular to, the vertical axis of the vessel.

6. A furnace according to claim 5, wherein the number of second electrodes is equal to, or is a multiple of, the number of first electrodes.

7. A direct arc furnace, comprising:
    a vessel for receiving a steelmaking charge;
    a source of d.c.;
    a plurality of massive first electrodes dependent into the vessel above the charge and symmetrically arranged around a circular path about the vertical axis of the vessel;
    means for connecting the negative pole of the d.c. source in common to the first electrodes;
    a plurality of second electrodes symetrically arranged about a circular path in the base of the vessel for contact with the charge;
    said base comprising an electrically insulating refractory medium, and
    switching means for selectively connecting one or more of the second electrodes to the positive pole of the d.c. source, each said second electrode being constituted by
    a local reservoir of steel located in the base,
    a refractory-housed steel rod and
    a fillet of steel which is conjoined with the rod and extends from the said reservoir.

8. A furnace according to claim 7, wherein the rods extend generally radially of, and lie in a plane perpendicular to, the vertical axis of the vessel and wherein the fillet of steel extends inwardly beyond the exposed reservoir whereby, when the vessel is tilted for tipping, the reservoir is never completely evacuated.

9. A furnace according to claim 8, comprising six second electrodes and three first electrodes each of which is in alignment with a second electrode, and wherein the switching means comprises
    a ganged set for connecting in the d.c. circuit the three aligned second electrodes and
    three individually operable switches for selectively connecting the remaining three intermediate second electrodes in the d.c. circuit.

10. A furnace according to claim 9, wherein said d.c. source is constituted by
    a multi-phase rectifier bank whereby to provide a multi-phase rectified supply for each electrode.

* * * * *